(12) United States Patent
Belpanno et al.

(10) Patent No.: US 11,351,647 B2
(45) Date of Patent: Jun. 7, 2022

(54) MULTI-SPINDLE MACHINE TOOLS

(71) Applicant: BRINKMAN PRODUCTS, INC., Rochester, NY (US)

(72) Inventors: Sandro G. Belpanno, Spencerport, NY (US); Paul P. Francia, Rochester, NY (US); Joseph Kent Palma, Penfield, NY (US)

(73) Assignee: Brinkman Products, Inc., Rochester, NY (US)

( * ) Notice: Subject to any disclaimer, the term of this patent is extended or adjusted under 35 U.S.C. 154(b) by 0 days.

(21) Appl. No.: 16/607,094

(22) PCT Filed: Apr. 21, 2017

(86) PCT No.: PCT/US2017/028877
§ 371 (c)(1),
(2) Date: Oct. 21, 2019

(87) PCT Pub. No.: WO2018/194662
PCT Pub. Date: Oct. 25, 2018

(65) Prior Publication Data
US 2020/0061770 A1   Feb. 27, 2020

(51) Int. Cl.
*B23Q 39/00* (2006.01)
*B23Q 5/10* (2006.01)

(52) U.S. Cl.
CPC .............. *B23Q 39/00* (2013.01); *B23Q 5/10* (2013.01); *B23Q 2039/006* (2013.01)

(58) Field of Classification Search
CPC .. B23Q 39/00; B23Q 2039/006; B23Q 16/02; B23Q 16/06; B23Q 16/10
See application file for complete search history.

(56) References Cited

U.S. PATENT DOCUMENTS

| | | | |
|---|---|---|---|
| 3,969,965 A | | 7/1976 | Hawkins |
| 4,318,465 A | * | 3/1982 | Calvert ................ B23Q 16/025 |
| | | | 198/341.02 |
| 4,324,161 A | * | 4/1982 | Klancnik .................. B23B 3/06 |
| | | | 29/27 C |

(Continued)

FOREIGN PATENT DOCUMENTS

| | | | | |
|---|---|---|---|---|
| JP | 57015656 A | * | 1/1982 | ........... G05B 19/238 |
| JP | 60201805 A | * | 10/1985 | ............. B23Q 16/02 |

OTHER PUBLICATIONS

The International Search Report (ISR) and Written Opinion for International (PCT) Application No. PCT/US17/28877; dated Nov. 28, 2017.

*Primary Examiner* — Alan Snyder
(74) *Attorney, Agent, or Firm* — Phillips Lytle LLP; David L. Principe

(57) ABSTRACT

The present invention provides certain additional improvements for such mechanical-type multi-axis machine tools. These improvements include: (1) permitting the spindles to be rotated about their respective axes relative to the member independently of one another, (2) providing a low-cost, and yet highly-effective, sensor apparatus for determining the angular position of the member relative to the frame without the use of an expensive encoder or the like, (3) mounting the rotatable member more precisely relative to the frame, and (4) providing a zero-backlash tool slide on the frame for imparting an action to a workpiece.

3 Claims, 4 Drawing Sheets

(56) References Cited

U.S. PATENT DOCUMENTS

| | | | |
|---|---|---|---|
| 4,507,993 A * | 4/1985 | Silverman | B23Q 16/02 |
| | | | 29/48.5 R |
| 4,640,158 A | 2/1987 | Link et al. | |
| 5,016,334 A | 5/1991 | Kovalenko et al. | |
| 6,219,895 B1 * | 4/2001 | Muscarella | B23Q 5/341 |
| | | | 29/38 B |
| 2004/0050221 A1 | 3/2004 | Babuder et al. | |
| 2007/0124904 A1 | 6/2007 | Muscarella et al. | |

* cited by examiner

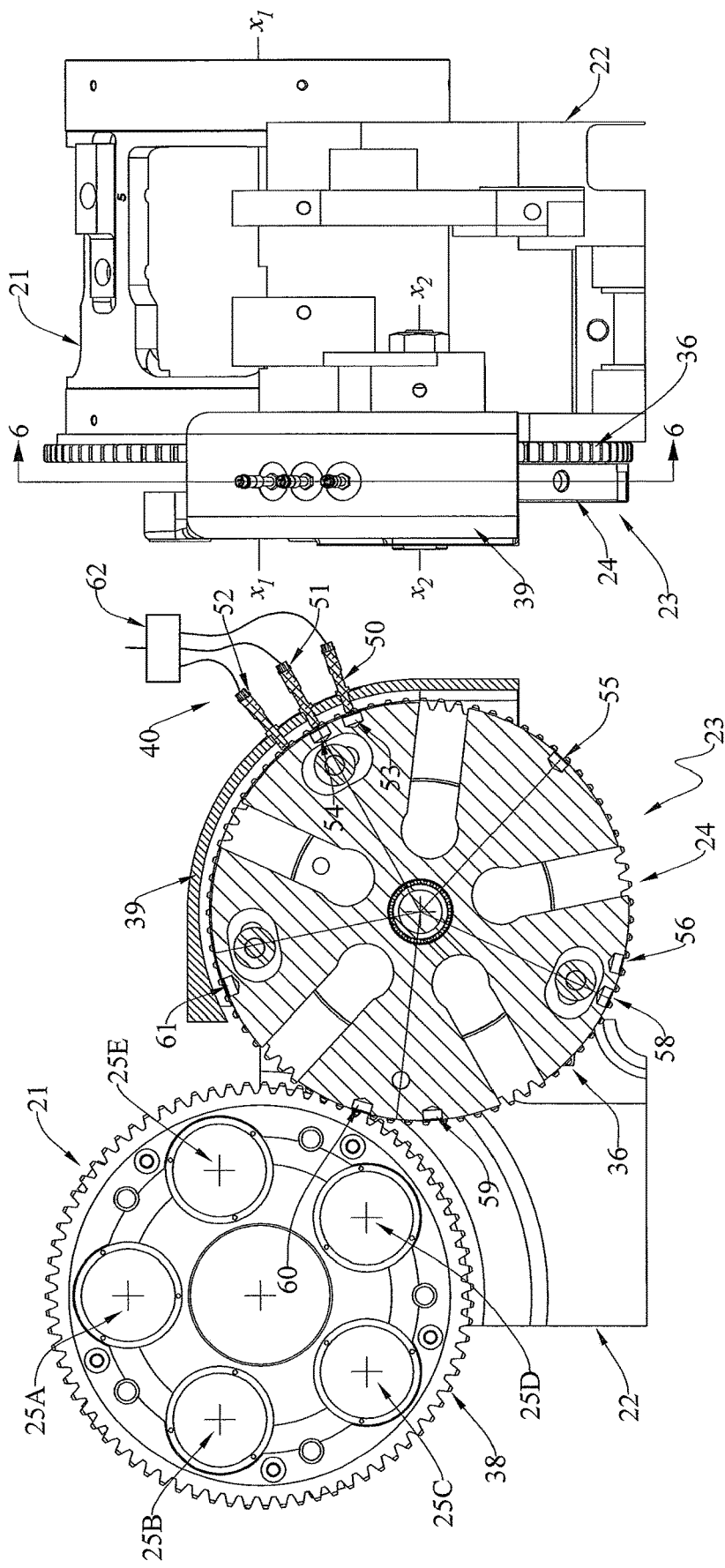

MULTI-SPINDLE MACHINE TOOLS

TECHNICAL FIELD

The present invention relates generally to machine tools, and, more particularly, to various improvements that can be made to mechanical-type multi-spindle machine tools to improve their performance. The improvements are particularly adapted for use with, but are not limited to, Davenport® multi-spindle automatic screw machines.

BACKGROUND ART

An automatic screw machine is a machine tool for machining a wide variety of parts from bar-stock. The bar-stock may have round, square or polygonal transverse cross-sections, and may be supplied to the screw machine in axial lengths on the order of ten to twelve feet. The screw machine typically has a head rotatably mounted on a supporting frame. The head is controllably indexable about the head axis through a plurality of successive angular positions. A plurality of circularly-spaced spindle assemblies are mounted on the head for rotation with the head about the head axis, and for rotation relative to the head about the various individual spindle assembly axes. Lengths of bar-stock are supplied axially to each spindle assembly, and rotate with the head assembly about the head axis. Hence, the rotatable head and the bar-stock supplied to the various spindle assemblies somewhat resembles a Gatling gun in outward appearance. The screw machine is adapted to perform various machining operations on cantilevered lengths of bar-stock (i.e., workpieces) that are held by and extend beyond the spindle assembly collets at the various angular positions of the head.

Each spindle assembly typically has an outer spindle rotatably mounted on the head, and is elongated along its own individual spindle assembly axis. The several spindle assembly axes are parallel to the head axis. Each outer spindle has an inwardly- and forwardly-facing frusto-conical cam surface. An inner spindle is arranged within the outer spindle for rotation with the outer spindle about the associated spindle assembly axis, and is mounted for limited axial movement relative to the associated outer spindle. A spindle-moving means or mechanism is operatively arranged to exert a force on the inner spindle to controllably move the inner spindle in one axial direction relative to the outer spindle. A collet is mounted on the inner spindle for movement therewith. The collet has a plurality of fingers that extend forwardly from a body. These fingers have angularly-segmented outwardly- and rearwardly-facing frusto-conical cam surfaces that engage the inwardly-facing cam surface on the associated outer spindle. Each finger has a pad that is adapted to be moved radially inwardly to engage a penetrant portion of the bar-stock when the inner spindle is moved in such one axial direction relative to the outer spindle. When the spindle-moving mechanism releases the force exerted on the inner spindle, the inner spindle moves in the opposite axial direction relative to the associated outer spindle, and the collet fingers are permitted to move radially outwardly (i.e., to spring back) toward their original positions such that the collet pads will disengage from and release the bar-stock.

A feed tube is arranged within each inner spindle for rotation about the associated spindle assembly axis, and for axial movement relative thereto. The feed tube has a plurality of feed fingers that are adapted to engage a length of penetrant bar-stock within the feed tube. A feed tube moving means or mechanism is provided for selectively causing the feed tube and feed fingers to selectively reciprocate in either axial direction (i.e., forwardly and rearwardly) relative to the inner spindle. Such movement of the feed tube is coordinated with operation of the collet so that the feed fingers may advance the bar-stock forwardly toward and through the collet when the collet fingers have moved radially away from the workpiece such that the collet is open. When the collet is closed, the feed tube is moved rearwardly away from the collet, with the feed fingers sliding along the bar-stock held in the closed collet.

One particular type of screw machine is the Davenport® five-spindle automatic screw machine. Davenport® is a registered trademark of Brinkman Products, Inc., 167 Ames Street, Rochester, N.Y. 14611, and the parent company of Davenport Machine, Inc. of the same address. The original Davenport® machines were developed in the late 19th Century and early 20th Century. Many early-version and remanufactured Davenport® machines are still in service today, and brand new machines are being sold as well.

The basic structure and operation of a Davenport® Model B five-spindle screw machine is shown and described in videos entitled, "Davenport Model B—Multi-Spindle Screw Machine #1", available at https://www.youtube.com/watch?v=N8hBtoNi3El, and "Davenport Model B—Multi-Spindle Screw Machine #2", available at https://www.youtube.com/watch?v=ppQydP2bd4k, the aggregate disclosures of which are hereby incorporated by reference. An indexing mechanism is adapted to controllably rotate the head relative to the frame through five sequential indexing positions (i.e., at 0°, 72°, 144°, 216°, 288°, . . . ) relative to the frame. These machines have a number of cutting and forming tools mounted on the frame and operatively arranged to engage the cantilevered lengths of bar-stock (i.e., workpieces) held by and extending beyond the collets of the several spindle assemblies at each of the various angularly-spaced index positions of the head. A single motor acted through a gear train, and rotated each of the five spindle assemblies simultaneously about their own individual spindle assembly axes at the same angular speed. The cutting and forming tools are mechanically coupled to the motor output shaft, and are timed (via various cams and followers) to perform various operations (both axially and radially) on the workpieces at each of the head index positions.

Over the years, the performance of these Davenport® machines has been improved by the addition of servo control (see, e.g., U.S. Pat. No. 6,421,895 B2), by the addition of man-machine interface control (Id.), by improved heads, by high-precision spindle assemblies (see, e.g., U.S. Pat. No. 6,817,273 B2 and U.S. Pat. No. 7,036,991 B2), by quick-change bearing assemblies (see, e.g., U.S. Pat. No. 7,402,927 B2), by larger spindle assemblies to accommodate oversized bar-stock (see, e.g., U.S. patent application Ser. No. 15/087,381, filed Mar. 31, 2016), by the use of improved collets (Id.), and the like. Indeed, others have filed patent applications on their perceived improvements to such Davenport® machines. (See, e.g., U.S. Pat. Nos. 6,000,499 A, 5,356,244 A and U.S. Pat. No. 5,205,376 A.) The aggregate disclosures of all of these prior art patents and patent application are hereby incorporated by reference to illustrate pertinent portions of such Davenport® machines and their respective specific improvements thereto. Thus, the mechanical-type of Davenport® five-spindle automatic screw machines have enjoyed a sort of renaissance with these various improvements upgrading their capabilities, accuracy and performance.

Another type of such machine tool is the Penta 518 five-spindle lathe, reportedly manufactured and sold by ZPS America LLC, 4950 West 79th Street, Indianapolis, Ind. 46268 (www.zpsamerica.com) and Tajmac-ZPS, a.s., Trida 3, kvetna 1180, CZ-76487, Tiln, Malenovice, Czechoslovakia (www.tajmac-zps.cz). The Penta 518 machine is another mechanical-type multi-spindle machine tool. The Penta 518 machine is shown and described in an article, "Five-Spindle Lathe Expands CNC Multi Line," *Production Machining*, Vol. 17, Issue 3 (March 2017).

In recent years, improved CNC screw machines have been developed that use digital technology to control the rotation of various spindle assemblies independently of one another, to control the operation of various tools, and to monitor the position of the head relative to the frame by means of expensive encoders. While these CNC machines are certainly capable, they are expensive to purchase and generally require specially-trained operators to program them. Hence, these CNC machines are particularly suited for long production runs where the higher cost of programming and set-up may be spread over a large number of parts produced. A current CNC machine is also reportedly manufactured and sold by the aforesaid ZPS America and Tajmac-ZPS, a.s. This CNC machine is reported to cost in excess of $800,000.

However, additional improvements can be made to the older mechanical-type machine tools, such as the Davenport® five-spindle screw machines, to further enhance their accuracy, performance and service life. They are generally faster, more productive and more economical than the more-recent CNC machines.

Hence, there is believed to be a continued need for improvements to such mechanical-type multi-spindle screw machines generally, and the Davenport® multi-axis automatic screw machines in particular, that (1) will permit the spindle assemblies to be rotated about their respective axes relative to the head independently of one another, (2) will provide a low-cost, and yet effective, means for determining the angular position of the head relative to the frame without the use of an expensive encoder or the like, (3) will mount the head more precisely relative to the frame, and (4) will provide zero-backlash tool slides on the frame for imparting an action to a workpiece.

DISCLOSURE OF THE INVENTION

With reference to the corresponding parts, portions or surfaces of the disclosed embodiment(s), merely for purposes of illustration and not by way of limitation, the present invention provides several improvements for use in a machine tool.

In one aspect, the invention provides an improved multi-spindle machine tool (20), which broadly comprises: a frame (22); a member (21) mounted on the frame for rotation about a member axis ($x_1$-$x_1$); an indexing mechanism (25) acting between the frame and member for selectively causing the member to rotate about the member axis relative to the frame sequentially between a plurality of angularly-spaced index positions; a plurality of spindle assemblies (28) mounted on the member for rotation therewith, each spindle assembly being mounted for rotation relative to the member about its own individual spindle assembly axis; a plurality of motors (29) mounted on the frame; and a plurality of ring gears (30) mounted on the member and engaging a respective one of the spindle assemblies, each ring gear being driven by a respective one of the motors; whereby the motors may be operated independently of one another to selectively rotate the respective spindle assemblies relative to the member at the desired rotational speeds.

The ring gears may be spaced axially from one another along the member axis.

Each of the motors may have an output shaft and a driving gear mounted on the output shaft, and wherein each driving gear is arranged to rotate a respective one of the ring gears.

The plurality may be five.

The machine tool may be a Davenport® automatic screw machine, and the member may be a head of the screw machine.

The indexing mechanism may be a Geneva indexing mechanism.

In another aspect, the invention provides a machine tool (20), such as a Davenport® Model B automatic screw machine, which broadly comprises: a frame (22); a member (21) mounted on the frame for rotation about a member axis ($x_1$-$x_1$); a Geneva indexing mechanism (23) acting between the frame and member for selectively causing the member to rotate relative to the frame sequentially between a plurality of angularly-spaced index positions, the Geneva indexing mechanism including a driving wheel (24) having a driving wheel axis ($x_2$-$x_2$), the driving wheel rotatably engaging the member; and a sensor apparatus (40) for determining the angular position of the driving wheel relative to the frame, the sensor apparatus including: a first plurality of proximity sensors (50, 51, 52) mounted on the frame and arranged to face toward the driving wheel, the sensors being arranged in a first array generated about the driving wheel axis; a second plurality of features (55-61) provided in the driving wheel at each index position and arranged to face toward the sensors, the features being arranged in a second array; and means (62) for generating a signal from the sensors such that the signal will indicate the particular index position of the driving wheel relative to the frame.

The second plurality may be different from the first plurality at some of the index positions.

The sensors may be proximity sensors operatively arranged to sense the presence or absence of material across the interface between the frame and member. The features may include at least one hole provided in the other of the frame and member.

The first array may be arranged to face toward the second array when the member is in each index position.

The member may be a head having a plurality of spindle assemblies mounted thereon, wherein the head has a head axis, wherein each spindle assembly has an individual spindle axis, and wherein the spindle assemblies are mounted on the head for rotation with the head about the head axis and for rotation relative to the head about their respective individual spindle axes.

The machine tool may be a Davenport® automatic screw machine.

In another aspect, the invention provides an improved multi-spindle machine tool (20), which broadly comprises: a frame (22); a member (21) mounted on the frame for rotation about a member axis ($x_1$-$x_1$); an indexing mechanism (25) acting between the frame and member for selectively causing the member to rotate about the member axis relative to the frame sequentially between a plurality of angularly-spaced index positions; a plurality of spindle assemblies (28) mounted on the member for rotation therewith, each spindle assembly being mounted for rotation relative to the member about its own individual spindle assembly axis; and at least one rolling-element (64) bearing acting between the member and frame such that the position of the member relative to the frame may be controlled at each of the index positions.

The machine tool may be a Davenport® automatic screw machine, and the member may be head of the screw machine.

In still another aspect, the invention provides an improved multi-spindle machine tool (20), which broadly comprises: a frame (22); a member (21) mounted on the frame for rotation about a member axis ($x_1$-$x_1$); an indexing mechanism (25) acting between the frame and member for causing the member to rotate relative to the frame about the member axis sequentially between a plurality of angularly-spaced index positions; a plurality of spindle assemblies (28) mounted on the member for rotation therewith, each of the spindles being mounted for rotation relative to the member about its own individual spindle axis; a chuck mounted on each spindle assembly for holding a workpiece; means for controllably rotating each of the spindle assemblies independently of one another at a desired angular speed; a zero-backlash tool slide (65) mounted on the frame and arranged to be controllably moved relative to the workpiece at each index position; and a tool (72) mounted on the slide for imparting an action to the workpiece (W).

The tool slide may include a ball screw.

The tool slide may include a linear rail.

The machine tool may be a Davenport® five-spindle automatic screw machine, and wherein the member may be a head on the screw machine.

Accordingly, the general object of the invention is to provide improvements to such mechanical-type multi-spindle screw machines generally, and the Davenport® multi-axis automatic screw machines in particular, that (1) will permit the spindle assemblies to be rotated about their respective axes relative to the head independently of one another, (2) will provide a low-cost, and yet effective, means for determining the angular position of the head relative to the frame without the use of an expensive encoder or the like, (3) will mount the head more precisely relative to the frame, and/or (4) will provide zero-backlash tool slides on the frame for imparting an action to a workpiece. These various improvements may be used singly, or in combination with one another.

These and other objects and advantages will become apparent from the foregoing and ongoing written specification, the drawings and the appended claims.

BRIEF DESCRIPTION OF THE DRAWINGS

FIG. 5 is a fragmentary side elevation of a portion of the head and indexing mechanism, showing one form of the sensor apparatus mounted on a guard and arranged to interact with features on the driven gear of the indexing apparatus.

FIG. 6 is a fragmentary vertical sectional view thereof, taken generally on line 6-6 of FIG. 5.

DESCRIPTION OF THE PREFERRED EMBODIMENTS

Figure 2:
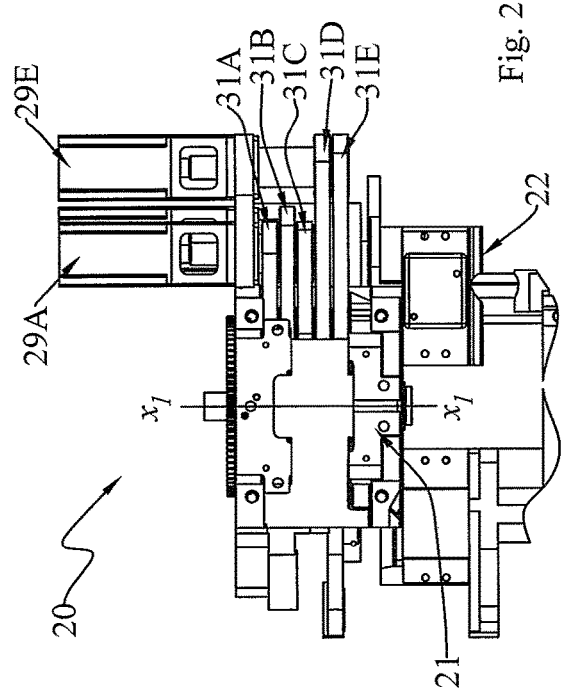
FIG. 2 is a fragmentary top plan view of the Davenport® five-spindle automatic screw machine shown in FIG. 1.

At the outset, it should be clearly understood that like reference numerals are intended to identify the same structural elements, portions or surfaces consistently throughout the several drawing figures, as such elements, portions or surfaces may be further described or explained by the entire written specification, of which this detailed description is an integral part. Unless otherwise indicated, the drawings are intended to be read (e.g., cross-hatching, arrangement of parts, proportion, degree, etc.) together with the specification, and are to be considered a portion of the entire written description of this invention. As used in the following description, the terms "horizontal", "vertical", "left", "right", "up" and "down", as well as adjectival and adverbial derivatives thereof (e.g., "horizontally", "rightwardly", "upwardly", etc.), simply refer to the orientation of the illustrated structure as the particular drawing figure faces the reader. Similarly, the terms "inwardly" and "outwardly" generally refer to the orientation of a surface relative to its axis of elongation, or axis of rotation, as appropriate.

Referring now to the drawings, the present invention provides certain improvements in machine tools. In the drawings, the particular type of machine tool is depicted as being a Davenport® five-spindle automatic screw machine. However, it should be clearly understood that the improvements are not limited to use with such Davenport® machines, but possess a general applicability to other types of multi-axis machine tools as well. Thus, as used herein, the term "machine tool" is intended broadly to refer to a machine for imparting an action to a workpiece, and a "multi-spindle machine tool" is intended to refer to a machine tool having more than one spindle assembly mounted on a "member" (sometimes known as a "head' or "drum") that is mounted for rotational movement about a member axis relative to a frame. In many cases, an indexing mechanism, such as a Geneva-type mechanism, is operatively arranged to cause the member to rotate sequentially through a plurality of angularly-spaced index positions.

As noted above, over the years, certain improvements have been provided for the mechanical-type multi-axis machine tools in order to increase their accuracy and capability. These prior art improvements have included the addition of servo control, by the addition of man-machine interface control, by improved heads, by high-precision spindle assemblies, by quick-change bearing assemblies, by larger spindle assemblies to accommodate oversized barstock, by the use of improved collets, and the like.

The present invention provides certain additional improvements for such mechanical-type multi-axis machine tools. These improvements include: (1) permitting the spindles to be rotated about their respective axes relative to the member independently of one another, (2) providing a low-cost, and yet highly-effective, sensor apparatus for determining the angular position of the member relative to the frame without the use of an expensive encoder or the like, (3) mounting the rotatable member more precisely relative to the frame, and (4) providing zero-backlash tool slides on the frame for imparting an action to a workpiece. These improved features will be discussed seriatim herebelow.

Independent Spindle Assembly Rotation (FIGS. 1-4)

Figure 1:
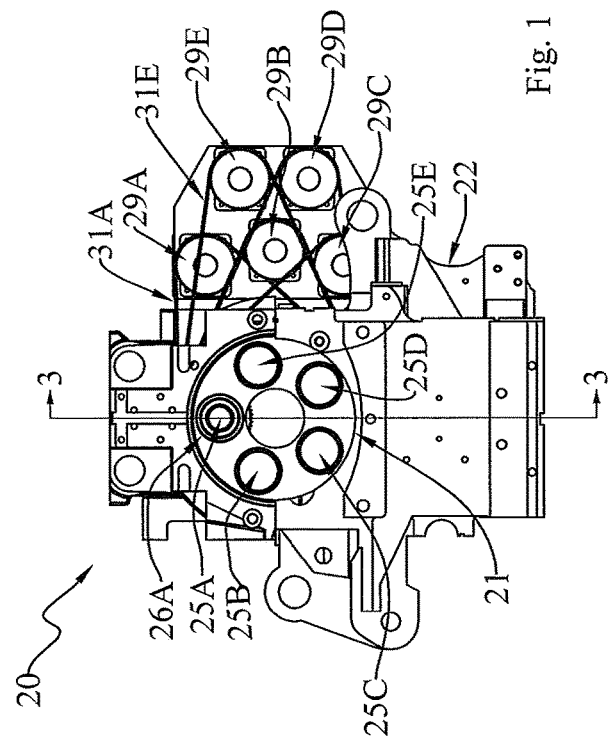
FIG. 1 is a fragmentary front elevational view of a portion of a multi-axis machine tool, and, more particularly, an improved Davenport® five-spindle automatic screw machine, incorporating the improvements of the present invention.

FIG. 1 is a fragmentary front elevation of a portion of a Davenport® five-spindle automatic screw machine, generally indicated at 20. In the following discussion, detailed descriptions of portions of the screw machine that are "old" (i.e., part of the prior art) will been omitted in the interest of clarity. This machine is shown as having a member or head 21 mounted on a frame 22 for rotation about a member axis $x_1$-$x_1$. An indexing mechanism 23, such as a Geneva drive, is arranged to act between the frame and head, and is operable to selectively cause the head to rotate about the head axis $x_1$-$x_1$ sequentially between five angularly-spaced index positions. The entire indexing mechanism does not appear in FIGS. 1-4, but the driven wheel 24 thereof is shown in FIGS. 5 and 6. Geneva-type indexing mechanisms are well known, and have been used for many years on Davenport® machines.

In FIG. 1, the head 21 is shown as having five circularly-spaced longitudinally-extending openings, each adapted to receive a spindle assembly. The rotational interval between these index positions is 72° for a five-spindle machine. These five head openings are severally indicated at 25, and are individually identified by the letters A, B, C, D and E, respectively. The spindle assemblies 26 themselves are individually "old", and are more fully shown and described in U.S. patent application Ser. No. 15/087,381, filed Mar. 31, 2016, the aggregate disclosure of which is hereby incorporated by reference.

Figure 3:
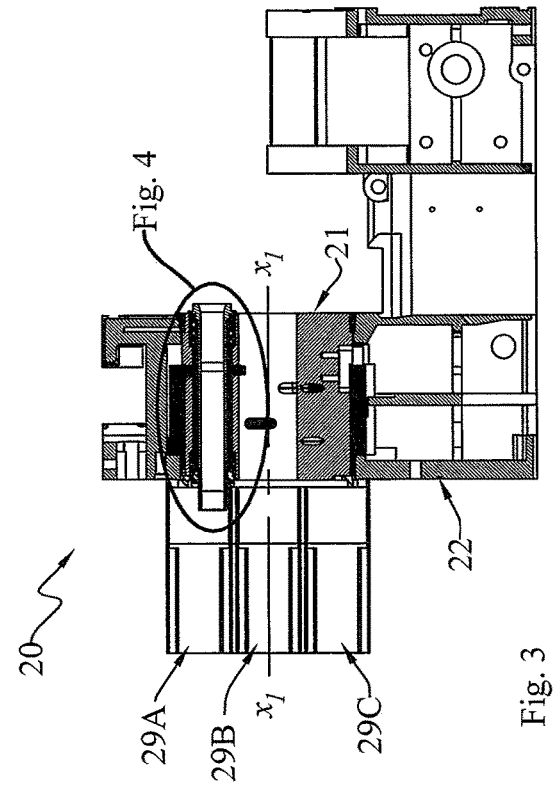
FIG. 3 is a fragmentary vertical sectional view thereof, taken generally on line 3-3 of FIG. 1.
Figure 4:
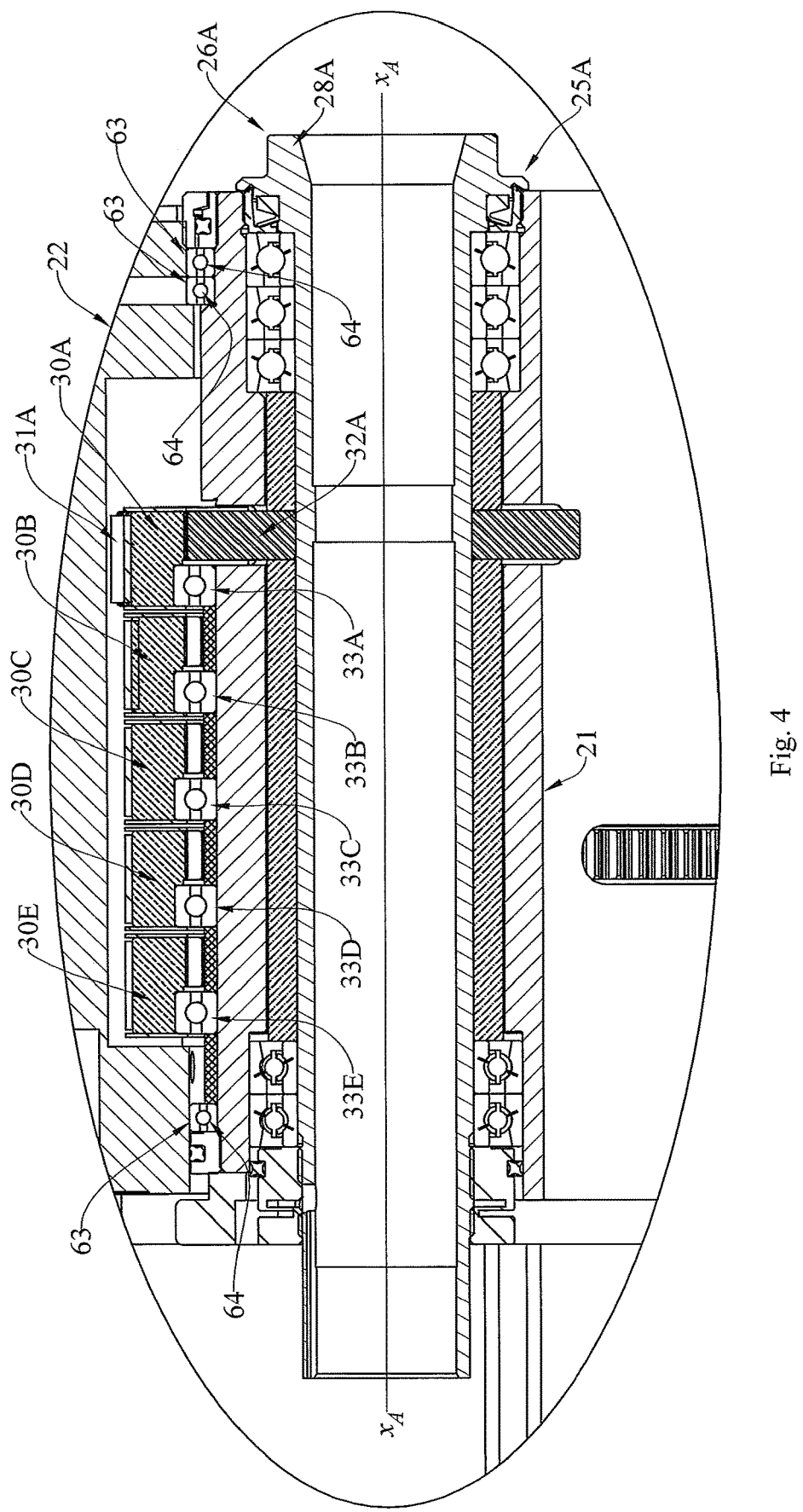
FIG. 4 is a greatly-enlarged detail view, taken within the indicated ellipse in FIG. 3, of the improved means for mounting a spindle assembly on the head.

There are five spindle assembles 26, one for each head opening. The spindle assemblies are individually identified by the suffixes A-E, respectively. Thus, spindle assembly 26A is operatively arranged in head opening 25A, spindle assembly 26B (not shown) is operatively arranged in head opening 25B, and so on. In FIG. 4, one such spindle assembly 26A is shown as including, in pertinent part, an outer spindle 28A. The inner spindle, the collet, the feed fingers, the workpiece, and the means for advancing the workpiece and for operating the collet of each spindle assembly have been omitted to avoid obfuscating the present improvement. Suffice it to say here that each spindle assembly 26 is positioned within the associated head opening 25, and is elongated along its respective spindle assembly axis. In FIGS. 2 and 4, the spindle assembly 26A in the twelve o'clock position of FIGS. 1 and 3 is shown as having a spindle axis $x_A$-$x_A$. The other spindle assemblies (not shown) are similarly elongated along their respective spindle axes $x_B$-$x_B$, $x_C$-$x_C$, $x_D$-$x_D$ and $x_E$-$x_E$, respectively. Each spindle assembly axis is parallel to head axis $x_1$-$x_1$. Each spindle assembly is mounted on the head for rotation therewith, and is mounted for rotation relative to the head about its own individual spindle axis.

In FIG. 1, a plurality of motors, severally indicated at 29 and individually identified by the suffixes A, B, . . . , E, are shown as being mounted on the frame. As best shown in FIG. 4 a plurality of ring gears, severally indicated at 30 and individually identified by the suffixes A, B, . . . , E, are mounted on the head at various axially-spaced locations along the head axis, and are respectively arranged to rotate associated ones of the spindle assemblies 26 via synchronous belts, severally indicated at 31 and again individually identified by the suffixes A, B, . . . , E, respectively. FIG. 4 depicts ring gear 30A as being coupled to outer spindle 26A via an intermediate gears 32A. Ring gears 30B, 30C, 30D and 30E are similarly coupled to their respective outer spindles 26B, 26C, 26D and 26E (not shown) via similar intermediate gears 32B, 32C, 32D and 32E (not shown), respectively. Thus, motor 29A is arranged to rotate spindle assembly 26A via synchronous belt 31A, ring gear 30A and intermediate gear 32A, motor 29B is arranged to rotate spindle assembly 29B via synchronous belt 31B, ring gear 30B and intermediate gear 32B, motor 29C is arranged to rotate spindle assembly 29C via synchronous belt 31C, ring gear 30C and intermediate gear 32C, motor 29D is arranged to rotate spindle assembly 29D via synchronous belt 31D, ring gear 30D and intermediate gear 32D, and motor 29E is arranged to rotate spindle assembly 29E via synchronous belt 31E, ring gear 30E and intermediate gear 32E.

In FIG. 4, each of the ring gears 30A, 30B, . . . , 30E is rotatably mounted on the head via roller bearings 33A, 33B, . . . , 33E, respectively. These several intermediate gears may have their inner surfaces secured to the outer spindle 28 of the associated spindle assembly, and may have their outer surfaces in meshing engagement with the inner surfaces of the associated ring.

The spindle assembly may be mounted on the head by high-precision bearing assemblies, such as shown and described in U.S. Pat. No. 6,817,273 B2 and/or U.S. Pat. No. 7,036,991 B2.

Motors 29 may be servomotors, stepping motors, or the like. The various motors may be operated independently of one another to selectively rotate the respective associated spindle assemblies relative to the head at the desired rotational speeds so as to controllably vary the rotational speeds of the workpieces held at each of the index positions. In addition, this improvement offers the capability of stopping, reversing and orienting the workpiece in the midst of an operation at each index position.

Thus this first aspect broadly provides a multi-spindle machine tool 20, comprising: a frame 21; a member 22 mounted on the frame for rotation about a member axis $x_1$-$x_1$; an indexing mechanism 23 acting between the frame and member for selectively causing the member to rotate about the member axis relative to the frame sequentially between a plurality of angularly-spaced index positions; a plurality of spindle assemblies 26A, 26B, . . . , 26E mounted on the member for rotation therewith, each spindle assembly being mounted for rotation relative to the member about its own individual spindle assembly axis $x_A$-$x_A$, $x_B$-$x_B$, $x_E$-$x_E$; a plurality of motors 29A, 29B, . . . , 29E mounted on the frame; and a plurality of ring gears 30A, 30B, . . . , 30E mounted on the member and engaging a respective one of the spindle assemblies 26A, 26B, . . . , 26E, each ring gear being driven by a respective one of the motors; whereby the motors may be operated independently of one another to selectively rotate the respective spindle assemblies relative to the member at the desired angular speeds.

Head Position Sensor (FIGS. 5-6)

Referring now to FIGS. 5-6, the driven wheel 24 of a Geneva-type indexing mechanism 23 is shown as having an outer toothed portion 36 in meshing engagement with a toothed portion 38 on the head. Driven wheel 24 has a plurality of blind slots extending radially inwardly from various circumferentially-spaced locations on its outer surface. These blind slots are adapted to receive the pin (not shown) mounted on the driving wheel (not shown) of the Geneva mechanism. In the well-known manner, rotation of the Geneva driving wheel causes the Geneva driven wheel to rotate about its axis $x_2$-$x_2$ between five successive angular index positons spaced 72° apart. This, in turn, causes like indexing motion of head 21.

An arcuate guard 39 is mounted on the frame 22, and closely encircles a portion of the Geneva driven wheel 24. A sensor apparatus, generally indicated at 49, comprises three proximity sensors 50, 51, 52 mounted on the guard and having their sensing heads arranged to closely face cooperative features on the Geneva driven wheel. In the illustrated embodiment, these features are different patterns of holes drilled at into the driven wheel at each of the five index positions.

When head opening 25A is in the 12:00 o'clock position (as seen in FIG. 6), proximity sensors 50 and 51 are radially aligned with blind holes 53, 54 drilled into the driven wheel. However, proximity sensor 52 is not aligned with any hole, and senses the presence of a proximate portion of the adjacent driven wheel.

When the indexing mechanism is operated to move head opening 25B to the 12:00 o'clock positon (as seen in FIG. 6), proximity sensor 51 will be aligned with a blind hole 55 drilled into the driven wheel. However, proximity sensors 50, 52 will not be aligned with any hole, and will sense the presence of proximate portions of the adjacent driven wheel.

When the indexing mechanism is operated to move head opening 25C to the 12:00 o'clock position (as seen in FIG. 6), proximity sensor 50 will not be aligned with any hole, and will sense the presence of a proximate portion of the adjacent driven wheel. However, proximity sensors 51, 52 will be aligned with blind holes 56, 58, respectively, drilled into the driven wheel.

When the indexing mechanism is operated to move head opening 25D to the 12:00 o'clock position (as seen in FIG. 6), proximity sensors 50, 52 will be aligned with blind holes 59, 60, respectively, drilled in the driven wheel. However, proximity sensor 51 will not be aligned with any hole, and will sense the presence of a proximate portion of the adjacent driven wheel.

When the indexing mechanism is operated to move head opening 25E to the 12:00 o'clock position (as shown in FIG. 6), proximity sensor 52 will be aligned with a blind hole 61 drilled into the driven wheel. However, proximity sensors 50, 51 will not be aligned with any hole, and will sense the presence of proximate portions of the adjacent driven wheel.

Thus, the three proximity sensors 50, 51, 52 are mounted on the guard, and are arranged to interact with features on the driven wheel at each of the five index positions. These features may simply be cooperative arrays of one or more holes at each index position, such that each proximity sensor may sense or determine the presence or absence of material facing it at each index position. Since the array of features is different at each index positon, the output signals from the proximity sensors may be used to indicate the angular position of the head relative to the frame at each index position. This arrangement is inexpensive and yet effective, and avoids the high cost of encoders or resolvers that are commonly found on CNC machines.

Thus, this aspect broadly provides a machine tool 20, such as a Davenport® Model B automatic screw machine, comprising: a frame 22; a member 21 mounted on the frame for rotation about a member axis $x_1$-$x_1$; a Geneva indexing mechanism 23 acting between the frame and member for selectively causing the member to rotate relative to the frame sequentially between a plurality of angularly-spaced index positions, the Geneva indexing mechanism including a driving wheel 24 having a driving wheel axis ($x_2$-$x_2$), the driving wheel rotatably engaging the member; and a sensor apparatus 40 for determining the angular position of the driving wheel relative to the frame, the sensor apparatus including: a first plurality of proximity sensors 50, 51, 52 mounted on the frame and arranged to face toward the driving wheel, the sensors being arranged in a first array generated about the driving wheel axis; a second plurality of features 53, 54, 55, 56, 58, 59, 60, 61 provided in the driving wheel at each index position and arranged to face toward the sensors, the features being arranged in a second array; and means 62 for generating a signal from the sensors such that the signal will indicate the particular index position of the driving wheel relative to the frame.

The sensor apparatus may employ proximity sensors (as described above), magnetics sensors, or other types of sensor that do or do not contact the sensors to the driven gear. The sensor apparatus may also be arranged to directly sense the index position of the head itself.

Improved Head Mount (FIG. 4)

In the known prior art forms of mechanical-type multi-spindle machine tools, the member (or head) typically had outwardly-facing large-diameter cylindrical surfaces that were simply journalled in large-diameter head openings that had inwardly-facing cylindrical surfaces that were arranged to face toward the head cylindrical surfaces. Hence, the head was simply journalled on the frame for rotation about the head axis. However, the radial clearance between the facing cylindrical surfaces of the head and frame contributed to a machining tolerance, and decreased the accuracy and precision of the machine tool.

In FIG. 4, the present invention is shown as providing bearings, severally indicated at 63, between the head and frame. These bearings severally have at least one roller element, such as a roller ball 64, arranged between its inner and outer races. Thus, this arrangement allows for ready rotation of the head relative to the frame, while, at the same time, eliminating the radial clearance that had existed in prior art designs in which the head was simply journalled on the frame.

Thus, this aspect of the invention provides an improved multi-spindle machine tool (20), which broadly comprises: a frame (22); a member (21) mounted on the frame for rotation about a member axis ($x_1$-$x_1$); an indexing mechanism (25) acting between the frame and member for selectively causing the member to rotate about the member axis relative to the frame sequentially between a plurality of angularly-spaced index positions; a plurality of spindle assemblies (28) mounted on the member for rotation therewith, each spindle assembly being mounted for rotation relative to the member about its own individual spindle assembly axis; and at least one rolling-element (64) acting between the member and frame such that the position of the member relative to the frame may be controlled at each of the index positions.

Figure 9:
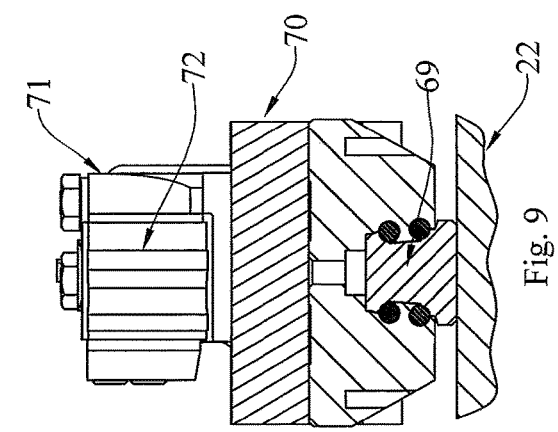
FIG. 9 is a fragmentary transverse vertical sectional view thereof, taken generally on line 9-9 of FIG. 7.
Figure 8:
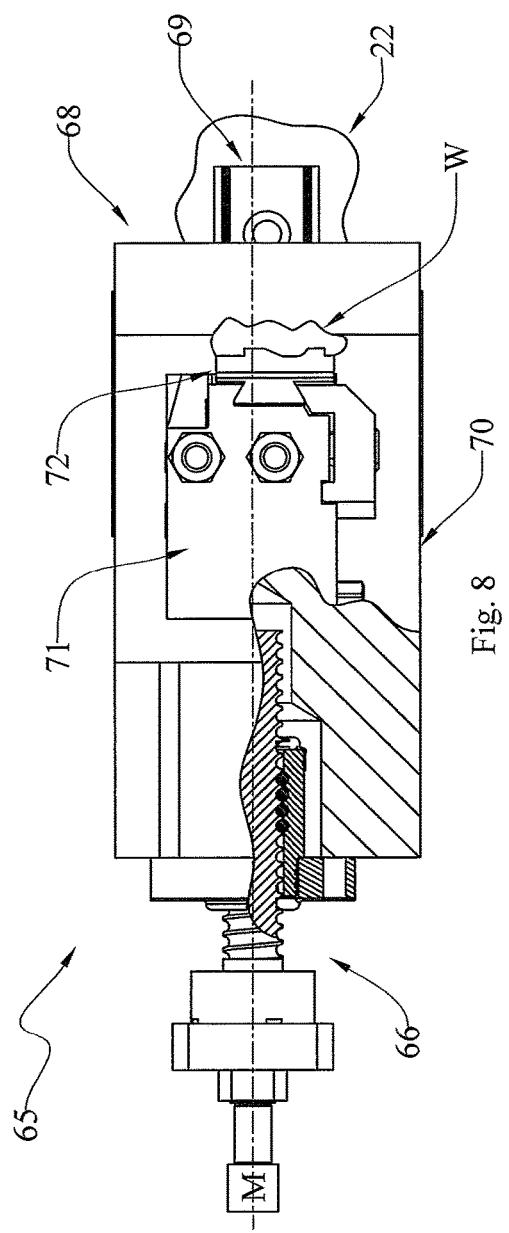
FIG. 8 is a fragmentary top plan view of the tool side shown in FIG. 7.
Figure 7:
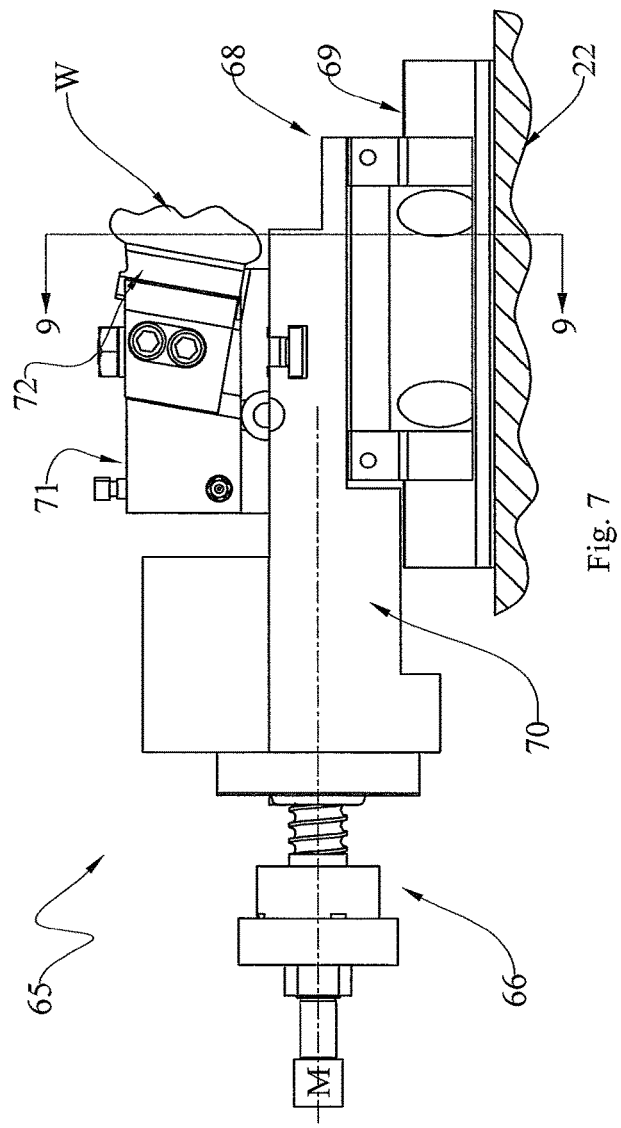
FIG. 7 is a fragmentary side elevation of the improved tool slide.

Improved Tool Slide (FIGS. 7-9)

Referring now to FIGS. 7-9, an improved tool slide, generally indicated at 65, is shown as being mounted on the machine frame 22. The tool slide includes a recirculating ball screw 66 and a linear rail 68. The ball screw is arranged to be rotated by a motor M mounted on the machine frame. The linear rail has a stationary rail-like portion 69 mounted on the frame, and has a movable portion 70 guided by the rail-like portion and driven by the ball screw. A tool holder 71 is mounted on the movable portion and is arranged to move a tool 72 toward and away from a workpiece W. The salient feature of the improved tool slide is that it may be moved toward and away from the workpiece with substantially-zero backlash. Thus, movement of the tool is substantially proportional to the polarity and magnitude of the current supplied to the ball screw motor so that tool position may be controlled electronically.

The improved tool slide may be operatively mounted on the frame to selectively move the tool in an axial or radial direction relative to the workpiece, as desired.

Therefore, this aspect of the invention provides an improved multi-spindle machine tool (20), which broadly comprises: a frame (22); a member (21) mounted on the frame for rotation about a member axis ($x_1$-$x_1$); an indexing mechanism (25) acting between the frame and member for causing the member to rotate relative to the frame about the member axis sequentially between a plurality of angularly-spaced index positions; a plurality of spindle assemblies (28) mounted on the member for rotation therewith, each of the spindles being mounted for rotation relative to the member about its own individual spindle axis; a chuck mounted on each spindle assembly for holding a workpiece; means for controllably rotating each of the spindle assemblies independently of one another at a desired angular speed; a zero-backlash tool slide (65) mounted on the frame and arranged to be controllably moved relative to the workpiece at each index position; and a tool (72) mounted on the slide for imparting an action to the workpiece (W).

Modifications

The present invention contemplates that many changes and modifications may be made. For example, while servomotors and the like are preferred, other types of motors may be substituted therefor. Similarly, the invention is not limited to use with synchronous belt drives. Other types of drives might readily be substituted.

In the preferred form, proximity sensors are used as part of the sensor apparatus. However, other types of sensors, such as magnetic sensors, and the like, might be substituted.

Reference to a Davenport® multi-axis screw machine in the claims is intended to be a limitation on the scope of the claims.

Therefore, while preferred forms of the invention have been shown and described, and several changes and modifications thereof discussed, persons skilled in this art will readily appreciate that various additional changes and modifications may be made without departing from the spirit of the invention, as defined and differentiated in the following claims.

What is claimed is:

1. A machine tool, comprising:
   a frame;
   a member mounted on said frame for rotation about a member axis;
   a Geneva indexing mechanism acting between said frame and member for selectively causing said member to rotate relative to said frame sequentially between a plurality of angularly-spaced index positions, said Geneva indexing mechanism including a driving wheel having a driving wheel axis, said driving wheel rotatably engaging said member; and
   a sensor apparatus for determining the angular position of said driving wheel relative to said frame, said sensor apparatus including:
   a first plurality of proximity sensors mounted on said frame and arranged to face toward said driving wheel, said sensors being arranged in a first array generated about said driving wheel axis;
   a second plurality of features provided in said driving wheel at each index position and arranged to face toward said sensors, said features being arranged in a second array; and
   means for generating a signal from said sensors such that said signal will indicate the particular index position of said driving wheel relative to said frame, and;
   wherein said proximity sensors are operatively arranged to sense the presence or absence of material across the interface between said fame and driving wheel, and wherein said features include at least one hole provided in said driving wheel at least one of said index positions.

2. A machine tool as set forth in claim 1 wherein said second plurality is different from said first plurality at some of said index positions.

3. A machine tool as set forth in claim 1 wherein said member is a head having a plurality of spindle assemblies mounted thereon, wherein said head has a head axis, wherein each spindle assembly has an individual spindle axis, and wherein said spindle assemblies are mounted on said head for rotation with said head about said head axis and for rotation relative to said head about their respective individual spindle axes.

* * * * *